United States Patent Office 3,238,237
Patented Mar. 1, 1966

3,238,237
METHOD OF PRODUCING TRIALKOXY
ALUMINUM COMPOUNDS
William C. Bedoit, Jr., Houston, Tex., assignor to Jefferson Chemical Company, Inc., Houston, Tex., a corporation of Delaware
No Drawing. Filed Aug. 10, 1959, Ser. No. 832,488
6 Claims. (Cl. 260—448)

This invention relates to a novel method of producing alkahols. More particularly, my invention pertains to the preparation of straight and branched chain primary alkyl monohydric alcohols having from 6 to 30 carbon atoms.

The alcohols produced by the novel method find their use in many industrial preparations such as in the manufacture of artificial perfumes, plasticizers and emulsifiers. My method is particularly applicable for producing alcohols of the $C_{10}$ to $C_{20}$ chain length. The sulfated ester salt derivatives of the $C_{10}$ to $C_{20}$ alkanols are the well known detergents of today such as sodium lauryl alcohol sulfate.

Broadly, I have discovered that alkanols of at least 6 carbon atoms can be produced by reacting a trialkylaluminum with ethylene to form a higher trialkylaluminum, treating the higher trialkylaluminum with ethylene oxide to form a higher trialkoxyaluminum, subsequently hydrolyzing the higher trialkoxyaluminum with an aqueous acid to form the desired higher primary alkanols of at least 6 carbon atoms.

More particularly, my method may be considered as a three-stage reaction:

STAGE I

The first stage comprises reacting a trialkylaluminum from 2 to 4 carbon atoms per alkyl group with ethylene at a temperature between about 90 and 130° C., preferably between 105 and 115° C., under autogenous pressure in a mol ratio of initial trialkyaluminum reactant to ethylene between about 1:3 and 1:36. This first stage reaction can be characterized as a growth reaction in which the ethylene adds to the trialkylaluminum in the following manner:

[R]₃Al  +  nCH₂=CH₂ ⟶
Trialkylaluminum        Ethylene

[R(CH₂—CH₂)ₙ/₃]₃ Al
Higher trialkylaluminum where R is an alkyl radical of from 2 to 4 carbon atoms, and $n$ is an integer from about 3 to about 36. The higher trialkylaluminum intermediate is a mixture of trialkylaluminums since the number of ethylene molecules adding to each trialkylaluminum reactant molecule will vary. The value for $n$ therefore represents the theoretical average number of molecules of ethylene adding to each trialkylaluminum molecule. Specific examples of the trialkylaluminum starting reactants contemplated herein are triethylaluminum and triisobutylaluminum.

Since the trialkylaluminum compounds contemplated herein spontaneously ignite upon contact with oxygen or water, it is desirable to conduct the first stage of the reaction under essentially anhydrous conditions and in an oxygen free atmosphere. The reaction is therefore preferably conducted in a closed vessel. Although the presence of inert liquid diluent is not necessary in the first stage, its presence is desirable in the second stage (subsequently described) to facilitate the dissipation of the heat of reaction. Specific examples of the inert diluent contemplated herein are any of the liquid alkanes such as n-heptane and isooctane.

In a typical first stage procedure inert diluent which has been purged free of air and water vapor by inert nitrogen gas is first added to a closed reactor and the initial trialkylaluminum reactant is introduced from a pressured cylinder. The reactor is then subsequently pressured (e.g., to 1000 p.s.i.g.) with the desired amount of ethylene and the reaction temperature is brought to the desired (e.g., to 110° C.) level. The first stage reaction mixture is preferably agitated during the reaction period.

The preferred reactor apparatus is an autoclave fitted with a stirrer and mounted on a rocker. In addition, the preferred autoclave also contains internal heating and cooling coils for accurate control of temperature.

STAGE II

In the second stage, the first stage reaction mixture containing the formed higher trialkylaluminum intermediate is cooled and maintained at a temperature between about −10 and 50° C., preferably between 25 and 35° C. To the cooled reaction mixture ethylene oxide is added. In a preferred procedure the oxide is added incrementally and with agitation in a mol ratio of oxide to initial trialkylaluminum of about 3:1. The ethylene oxide adds to the higher trialkylaluminum to form a higher trialkoxyaluminum intermediate product in the following manner:

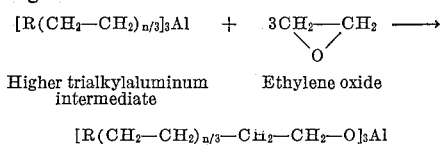

Higher trialkylaluminum        Ethylene oxide
intermediate

[R(CH₂—CH₂)ₙ/₃—CH₂—CH₂—O]₃Al
Higher trialkoxyaluminum intermediate where R and $n$ are as heretofore defined. This second stage reaction is normally conducted in the same reactor as the first stage and under autogenous pressure.

STAGE III

To the reaction mixture of the second stage it is desirable to add methanol, preferably with agitation, to destroy any unreacted trialkylaluminum. The contents of the reactor are then preferably heated under reduced pressure to remove by distillation the volatile materials such as diluent (if any), unreacted ethylene oxide, methanol and ethylene from the relatively non-volatile higher trialkoxyaluminum intermediate. The trialkoxyaluminum intermediate product is then hydrolyzed to the desired primary alkyl monohydric alcohols by the addition of an aqueous mineral acid, e.g. hydrochloric acid, thereto. The preferred amount of acid utilized is about 3 equivalents of acid per mol of trialkoxyaluminum with a slight stoichiometric excess of acid being most preferred. The strength of the aqueous acid is preferably at least about 5 wt. percent. The aqueous acid is desirably added to the trialkoxyaluminum slowly with stirring since much heat is liberated during the hydrolysis. This hydrolysis reaction is further described by the following chemical equation:

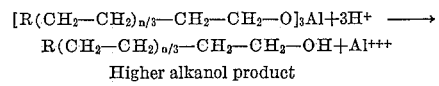

Higher alkanol product

R and $n$ are as heretofore defined.

Separation and purification

The final reaction mixture of the third stage separates into two layers, namely, into a layer comprising the higher alkanol product of six carbon atoms or more and an aqueous layer. These two layers may be separated from one another by any of the standard means such as decantation. If a maximum alcohol product yield is desired, the traces of alcohol product remaining in the aqueous layer should be removed. These traces are best removed by ether extraction followed by a steam distillation of the aqueous layer. For additional yield the steam distillate can also be extracted with ether. The ethereal solutions are added to the alcohol layer. The resultant solution is then desirably filtered through glass wool or other suitable media to remove solid bodies. Recovery of specific alkanols from the filtrate can be accomplished by any of the standard means. A preferred means is fractionally distilling the filtrate, first at atmospheric pressure, then under reduced pressure.

My invention is further illustrated by the following example.

*Example I.*—Into a 1-liter stirred autoclave there were placed 150 mls. (milliliters) of n-heptane and 32.5 grams (0.164 mol) of triisobutylaluminum and 50 grams (1.8 mol) of ethylene. The autoclave contents were heated to 120° C. for 22 hours. During this interval the reaction pressure decreased from 760 p.s.i.g. (pounds per square inch gauge) to 150 p.s.i.g. The reaction mixture was then cooled to 30° C. and ethylene oxide was added in 5 mls. portions at 30 minute intervals until 33.0 mls. (0.66 mol) had been added. Throughout the ethylene oxide addition tap water was passed through the cooling coils located within the autoclave to prevent any temperature rise. The contents of the autoclave were then allowed to stand at room temperature for 72 hours.

To the autoclave there was added 20 grams (0.63 mol) of methanol. After stirring for 30 minutes the autoclave was vented. The product, a snow-white solid, was heated in vacuo to 95° C. to remove excess methanol. The white solid residue weighed 36 grams, decomposed at 270° C. without melting and had an aluminum content of 12.2%.

Thirty-four grams of the snow-white residue was hydrolyzed with a solution of 42 mls. of concentrated hydrochloric acid dissolved in 136 mls. of water. The resultant mixture separated into an upper alcoholic layer and a lower aqueous layer. The mixture was extracted twice with 200 ml. portions of ether. The ether extract solutions were combined and set aside. The mixture was further treated to a steam distillation (after collecting a forecut to 95° C.) until 125 mls. of water had been collected. The distinct organic upper layer of the steam distillation residue was extracted with 200 mls. of ether and the resultant ether solution was added to the above combined ether solutions. The combined ethers were then filtered through a glass wool and evaporated to yield 12 grams of an orange colored viscous oil.

The viscous oil was subjected to fractional distillation through a 12 mm. x 60 mm. (millimeter) silvered fractionating column packed with protruded stainless steel packing to recover the primary alkyl monohydric alcohol products.

The distillation conditions and primary alkyl monohydric alcohol products recovered are reported below in Table I.

departing from the spirit and scope thereof and therefore only such limitations should be imposed as are indicated in the appended claims.

I claim:

1. A method for producing a higher primary alkanol of from 6 to 30 carbon atoms which comprises the steps of:
    (1) mixing a trialkylaluminum having from 2 to 4 carbon atoms per alkyl group with ethylene at a temperature between about 90° and 130° C. under autogenous pressure in a mol ratio of said ethylene to said trialkylaluminum between about 3:1 and 36:1 to form a higher trialkylaluminum having the formula:

$$[R(CH_2-CH_2)_{n/3}]_3Al$$

in which R is an alkyl radical of from 2 to 4 carbon atoms and $n$ is an integer from about 3 to about 36;
    (2) subsequently mixing said higher trialkylaluminum with ethylene oxide at a temperature between about $-10°$ and 50° C. under autogenous pressure and in a mol ratio of ethylene oxide to said trialkylaluminum of about 3:1 to form a higher trialkoxyaluminum compound;
    (3) treating said higher trialkoxyaluminum compound with about 3 equivalents of an aqueous mineral acid per mol of said trialkoxyaluminum compound to form a product comprising a higher alkanol; and
    (4) fractionally distilling said product to recover said higher primary alkanol.

2. A process for preparing alkanols which comprises the step of reacting ethylene oxide with a trialkyl aluminum wherein the alkyl group is from 4 to 28 carbon atoms, said compound being reacted in a molar ratio of ethylene oxide to aluminum compound of about 3 to 1 at a temperature from $-10°$ to 50° C. and hydrolyzing the reaction product of said ethylene oxide and said aluminum compound in the presence of HCl to produce the alkanol.

3. A method for preparing a trialkoxyaluminum represented by the formula:

$$[R(CH_2-CH_2)_{n/3}-CH_2-CH_2-O]_3Al$$

in which R is an alkyl radical of from 2 to 4 carbon atoms and $n$ is an integer from about 3 to about 36 which comprises contacting a trialkylaluminum, represented by the formula:

$$[R(CH_2-CH_2)_{n/3}]_3Al$$

in which R and $n$ have the values noted above with ethylene oxide in a mol ratio of ethylene oxide to said trialkylaluminum of about 3:1.

4. A method according to claim 3 in which said reaction is effected at a temperature range from $-10°$ to 50° C.

5. A method according to claim 3 in which said trialkylaluminum is triisobutylaluminum.

TABLE 1

| Fraction | Head Temp., °C. | Press. mm. of Hg | Weight Fraction, Grams | R.I. (n/22D) | OH No. | M.W. based on OH No. | Empirical Formula of Alcohol Fraction |
|---|---|---|---|---|---|---|---|
| A [1] | Ambient–60. | 2.5 | 2.8 | | | | |
| B | 60–85 | 2.5 | 0.8 | 1.4216 | 342 | 164 | $C_{10}H_{21}OH$ |
| C | 85–90 | 2.5 | 0.6 | 1.4242 | 350 | 160 | $C_{10}H_{21}OH$ |
| D | 95–106 | 2.0 | 0.8 | 1.4319 | 309 | 182 | $C_{12}H_{25}OH$ |
| E [2] | | | 7.0 | 1.4442 | 266 | 211 | $C_{14}H_{29}OH$ |

[1] Forecut.
[2] Kettle residue.

Unless otherwise stated, all percentages, ratios and parts heretofore and hereafter recited are based on weight.

Obviously, many modifications and variations of the invention as hereinbefore set forth may be made without 6. A method according to claim 3 in which said reaction is effected under autogenous pressure at a temperature within the range of about $-10°$ to about 50° C.

(References on following page)

References Cited by the Examiner

UNITED STATES PATENTS

| | | | |
|---|---|---|---|
| 2,863,895 | 12/1958 | Kirshenbaum et al. | 260—632 X |
| 2,892,858 | 6/1959 | Ziegler | 260—632 X |
| 2,944,948 | 7/1960 | Giraitis | 260—448 X |

FOREIGN PATENTS

| | | |
|---|---|---|
| 716,126 | 9/1954 | Great Britain. |
| 808,055 | 1/1959 | Great Britain. |

OTHER REFERENCES

Huston et al.: Journal of Organic Chemistry, 6, 123–33 (1941).

LEON ZITVER, *Primary Examiner.*

CHARLES B. PARKER, ABRAHAM H. WINKELSTEIN, *Examiners.*

L. WEINBERGER, J. E. EVANS, J. C. LANGSTON, M. B. ROBERTO, I. R. PELLMAN,
*Assistant Examiners.*